United States Patent
Nakamura

(10) Patent No.: US 11,231,582 B2
(45) Date of Patent: Jan. 25, 2022

(54) DISPLAY DEVICE, DISPLAY SYSTEM, AND MOBILE OBJECT

(71) Applicant: Ricoh Company, Ltd., Tokyo (JP)

(72) Inventor: Kento Nakamura, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 6 days.

(21) Appl. No.: 16/770,643

(22) PCT Filed: Dec. 28, 2018

(86) PCT No.: PCT/JP2018/048503
§ 371 (c)(1),
(2) Date: Jun. 8, 2020

(87) PCT Pub. No.: WO2019/171735
PCT Pub. Date: Sep. 12, 2019

(65) Prior Publication Data
US 2021/0173208 A1    Jun. 10, 2021

(30) Foreign Application Priority Data

Mar. 9, 2018   (JP) .............................. JP2018-042728

(51) Int. Cl.
*G02B 27/01*   (2006.01)
*B60K 35/00*   (2006.01)
(Continued)

(52) U.S. Cl.
CPC .......... *G02B 27/0101* (2013.01); *B60K 35/00* (2013.01); *G02B 3/0037* (2013.01);
(Continued)

(58) Field of Classification Search
CPC .... G02B 27/0101; G02B 3/0037; G02B 5/02; G02B 5/0278; G02B 2027/0118;
(Continued)

(56) References Cited

U.S. PATENT DOCUMENTS

2015/0219803 A1   8/2015   Inamoto et al.
2016/0334637 A1   11/2016  Saisho et al.
(Continued)

FOREIGN PATENT DOCUMENTS

JP   2009-150947 A   7/2009
JP   2015-025874 A   2/2015
(Continued)

OTHER PUBLICATIONS

International Search Report and Written Opinion dated Apr. 29, 2019 in PCT/JP2018/048503 filed on Dec. 28, 2018.
(Continued)

*Primary Examiner* — Ryan D Howard
(74) *Attorney, Agent, or Firm* — Xsensus LLP

(57) ABSTRACT

A display system 1A includes a light deflector 13 that scans the light beams that are emitted from a light-source device 11 in the main scanning direction and the sub-scanning direction orthogonal to the main scanning direction to form an intermediate image 40 on a screen 15, the screen 15 that disperses the light, a front windshield 50 that reflects the diverging light diverging from the screen 15, and a free-form surface mirror 30 that projects the diverging light diverging from the screen 15 towards the screen 15 to form a virtual image 45. The screen 15 is arranged so as to satisfy the condition in the following equation: S*O*(M+O)/(T*E*M) ≤1.95 where S denotes distance between a location of eyepoint of the viewer of the virtual image and the virtual image, E denotes distance between the location of eyepoint of the viewer of the virtual image and an image forming optical system that uses the diverging light to form the virtual image, M denotes distance between the light deflector and the intermediate image, and O denotes distance between the intermediate image and the image forming optical system, and T denotes distance between the virtual (Continued)

image and the image forming optical system, where each distance indicates length of an optical path that passes through a center of an image formed by the light when an object is observed from a reference eyepoint.

6 Claims, 17 Drawing Sheets

(51) Int. Cl.
*G02B 3/00* (2006.01)
*G02B 26/10* (2006.01)
*G02B 5/10* (2006.01)

(52) U.S. Cl.
CPC .... *G02B 26/101* (2013.01); *B60K 2370/1529* (2019.05); *G02B 5/10* (2013.01)

(58) Field of Classification Search
CPC .......... G02B 26/101; G02B 2027/0145; G02B 3/0056; B60K 35/00; B60K 2370/1529
See application file for complete search history.

(56) References Cited

U.S. PATENT DOCUMENTS

| | | |
|---|---|---|
| 2017/0154406 A1 | 6/2017 | Atsuumi et al. |
| 2017/0285341 A1 | 10/2017 | Nakagawa et al. |
| 2018/0252916 A1 | 9/2018 | Nakamura et al. |
| 2018/0267306 A1 | 9/2018 | Nakamura et al. |

FOREIGN PATENT DOCUMENTS

| | | |
|---|---|---|
| JP | 2015-232693 | 12/2015 |
| JP | 2016-045385 | 4/2016 |
| WO | 2016/035607 A1 | 3/2016 |

OTHER PUBLICATIONS

Office Action dated Nov. 9, 2021 in Japanese Patent Application No. 2018-042728, 3 pages.

DISPLAY DEVICE, DISPLAY SYSTEM, AND MOBILE OBJECT

TECHNICAL FIELD

Embodiments of the present disclosure relate to a display device, a display system, and a mobile object.

BACKGROUND ART

Display devices such as a heads-up display (HUD) are used as an application in a mobile object such as a vehicle that allows a driver (viewer) to recognize various kinds of information (for example, vehicle information, navigation information, and warning information) with a reduced amount of movement in line of vision.

For example, an image display apparatus is known in the art that uses an optical scanner to scan the image light emitted from a light source two-dimensionally in the main scanning direction and the sub-scanning direction and forms an intermediate image on a light dispersing member (e.g., see PTL 1). The image display apparatus disclosed in PTL 1 then projects the magnified intermediate image to a to-be-projected member such as the front windshield of a vehicle, such that an image (virtual image) is superimposed in the viewing field of a viewer.

As a method for downsizing an image display apparatus, a method for shortening the optical path length between a light dispersing member and a reflector such as a free-form surface mirror is known in the art.

CITATION LIST

Patent Literature

PTL 1: Japanese Patent Application Publication No. 2013-061554

SUMMARY OF INVENTION

Technical Problem

However, when the optical path length between the light dispersing member (e.g., an optical element) and the light reflecting member is shortened, the incident angles of the bundle of laser beams that are exited from the light dispersing member become wide on the light reflecting member. For this reason, the incident angles of the bundle of laser beams near the edges in the main scanning direction become wider. Due to circumstances, the brightness of portions of an image near the edges in the main scanning direction is reduced, and the portions of an image near the edges in the main scanning direction become relatively dark. This leads to degradation in the image quality of a virtual image that the viewer visually recognizes.

Solution to Problem

An image display device according to an embodiment of the present disclosure is provided with an optical element that disperses light, and uses the diverging light diverging from the optical element to form a predetermined virtual image so as to be visually recognized by the viewer. Moreover, the optical element of the image display device is arranged such that the condition in the First Equation as given below is satisfied.

First Equation $$S \times O \times (M+O)/(T \times E \times M) \leq 1.95 \quad [\text{Math.1}]$$

In the above first equation, S denotes the distance between the location of the eyepoint of the viewer of the virtual image and the virtual image, and E denotes the distance between the location of the eyepoint of the viewer of the virtual image and the image forming optical system that uses the diverging light to form the virtual image. M denotes the distance between the light deflector that two-dimensionally scans the optical element to form an intermediate image on the optical element and the intermediate image, and O denotes the distance between the intermediate image and the image forming optical system. Moreover, T denotes the distance between the virtual image and the image forming optical system. Note that each distance indicates length of an optical path that passes through a center of an image formed by the light when an object is observed from a reference eyepoint.

Advantageous Effects of Invention

According to one aspect of the present disclosure, reduction in the brightness of an edge of the image that is visually recognized by a viewer and reduction in brightness when the viewer moves his/her location of the eyepoint can be prevented.

DESCRIPTION OF EMBODIMENTS

Embodiments of the present disclosure are described below with reference to the accompanying drawings. In the description of the drawings, like reference signs denote like elements, and overlapping descriptions are omitted.

First Embodiment

System Configuration

Figure 1:
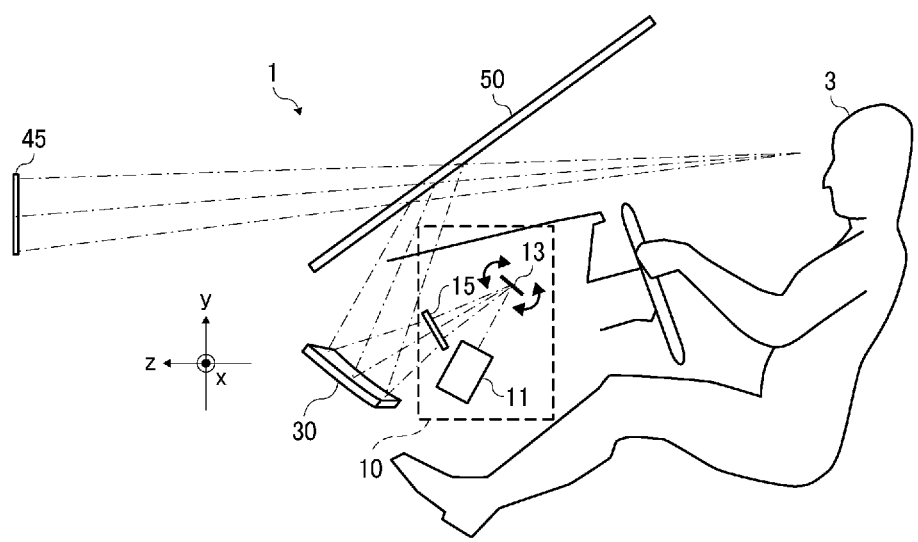
FIG. 1 is a diagram illustrating a system configuration of a display system according to a first embodiment of the present disclosure.

FIG. 1 is a diagram illustrating a system configuration of a display system 1A according to an embodiment of the present disclosure. The display system 1A as illustrated in FIG. 1 prevents reduction in brightness at the edge of an image that is visually recognized by a viewer 3 (i.e., a virtual image 45) and reduction in brightness when the viewer 3 moves his/her location of the eyepoint, and enables the viewer 3 to visually recognize an image with a sufficient brightness distribution.

In the display system 1A, the viewer 3 can visually identify a display image, as the projection light that is projected from a display device 10 is projected onto a transmissive reflector. The display image is an image superimposed on the viewing field of the viewer 3 as the virtual image 45. For example, the display system 1A is provided for a mobile object such as a vehicle, an aircraft, and a ship, or an immobile object such as a maneuvering simulation system, and a home-theater system. In the present embodiment, cases in which the display system 1A is provided for a vehicle as an example of the mobile object is described. However, no limitation is intended thereby, and the type of usage of the display system 1A is not limited to the present embodiment.

For example, the display system 1A is mounted in a vehicle, and makes navigation information visible to the viewer 3 (i.e., the driver) through a front windshield 50 of the vehicle. The navigation information includes, for example, the information about the speed of the vehicle, the course information, the distance to a destination, the name of the current place, the presence or position of an object ahead of the vehicle, a traffic sign indicating, for example, speed limit, and traffic congestion, and aids the driving of the vehicle. In this configuration, the front windshield 50 serves as a transmissive reflector that transmits some of the incident light and reflects at least some of the remaining incident light. The distance between the location of the eyepoint of the viewer 3 and the front windshield 50 is about several tens of centimeters (cm) to one meter (m).

The display system 1A according to the present embodiment is provided with the display device 10, a free-form surface mirror 30, and a front windshield 50. For example, the display device 10, is a heads-up display (HUD) provided for a vehicle as an example of the mobile object. The display device 10 may be arranged at any desired position in conformity with the interior design of the vehicle. For example, the display device 10 according to the present embodiment may be disposed under the dashboard of the vehicle or built into the dashboard of the vehicle.

The display device 10 is provided with a light-source device 11, a light deflector 13, and a screen 15. The light-source device 11 is a device that emits the laser beams emitted from a light source outside the device. For example, the light-source device 11 may emit laser beams in which three-color laser beams of red, green, and blue (RGB) are combined. The laser beams emitted from the light-source device 11 are guided to the reflection plane of the light deflector 13. For example, the light-source device 11 has a semiconductor light-emitting element such as a laser diode (LD) that serves as a light source. However, no limitation is intended thereby, and the light source may be a semiconductor light-emitting element such as a light-emitting diode (LED).

The light deflector 13 is a device that uses, for example, the micro-electromechanical systems (MEMS) to change the directions of travel of the laser beams. The light deflector 13 is configured by a scanner such as a mirror system composed of one minute MEMS mirror that pivots around two axes orthogonal to each other or two MEMS mirrors that pivot or rotate around one axis. The laser beams that are emitted from the light deflector 13 scan the screen 15. The light deflector 13 is not limited to a MEMS mirror, but may be configured by a polygon mirror or the like.

The screen 15 serves as a divergent part that diverges the laser beams at a predetermined divergence angle. For example, the screen 15 may consist of an exit pupil expander (EPE), and may be configured by a transmissive optical element such as a microlens array (MLA) or diffuser panel that diffuses light. Alternatively, the screen 15 may be configured by a reflective optical element such as a micromirror array that diffuses light. The screen 15 forms a two-dimensional intermediate image 40 on the screen 15 as the laser beams emitted from the light deflector 13 scan the surface of the screen 15.

A method of projecting an image using the display device 10 may be implemented by a panel system or a laser scanning system. In the panel system, the intermediate image 40 is formed by an imaging device such as a liquid crystal panel, a digital micromirror device (DMD) panel (digital mirror device panel), or a vacuum fluorescent display (VFD). In the laser scanning system, the intermediate image 40 is formed by scanning the laser beams emitted from the light-source device 11, using an optical scanner.

The display device 10 according to the first embodiment adopts the laser scanning system. In the laser scanning system, each pixel can be assigned to either an emitting pixel or a non-emitting pixel. Accordingly, in the laser scanning system, a high-contrast image can be formed in most cases. In some alternative embodiments, the above-described panel system may be adopted as the projection system in the display device 10.

The virtual image 45, which is projected onto the free-form surface mirror 30 and the front windshield 50 as the intermediate image 40 that is formed by the laser beams (bundle of laser beams) emitted from the screen 15, is magnified for view. The free-form surface mirror 30 is designed and arranged so as to cancel, for example, the inclination of the image, the distortion of the image, and the displacements of the image, which are caused by the bent shape of the front windshield 50. The free-form surface mirror 30 may be arranged in a manner such that the mirror 30 can pivot around the rotation axis. Due to such a configuration, the free-form surface mirror 30 can adjust the reflection direction of the laser beams (bundle of laser beams) emitted from the screen 15 to change the position at which the virtual image 45 is displayed.

In the present embodiment, the free-form surface mirror 30 is designed using a commercially available optical design simulation software such that the free-form surface mirror 30 has a certain level of light-gathering power to achieve a desired image-forming position of the virtual image 45. In the display device 10, the light-gathering power of the free-form surface mirror 30 is designed such that the virtual image 45 is displayed at a position away from the location of the eyepoint of the viewer 3 in the depth direction by, for example, at least 1 m and equal to or shorter than 30 m (preferably, equal to or shorter than 10 m). The free-form surface mirror 30 may be a concave mirror or a curved-surface mirror. The free-form surface mirror 30 is an example of an image forming optical system.

The front windshield 50 serves as a transmissive reflector that transmits some of the laser beams (bundle of laser beams) and reflects at least some of the remaining laser beams (partial reflection). The front windshield 50 may serve as a semitransparent mirror through which the viewer 3 visually recognizes the virtual image 45 and the scenery ahead of the mobile object (vehicle). The virtual image 45 is an image that is visually recognized by the viewer 3, including vehicle-related information (e.g., speed and travel distance), navigation information (e.g., route guidance and traffic information), and warning information (e.g., collision warning). For example, the transmissive reflector may be another front windshield arranged in addition to the front windshield 50. The front windshield 50 is an example of a reflector.

The virtual image 45 may be displayed so as to be superimposed on the scenery ahead of the front windshield 50. The front windshield 50 is not flat but is curved. For this reason, the position at which the virtual image 45 is formed is determined by the curved surface of the free-form surface mirror 30 and the front windshield 50. In some embodiments, the front windshield 50 may be a semitransparent mirror (combiner) that serves as a separate transmissive having a reflector partial reflection function.

Due to such a configuration as above, the laser beams (bundle of laser beams) emitted from the screen 15 is projected towards the free-form surface mirror 30, and is reflected by the front windshield 50. Accordingly, the viewer 3 can visually recognize the virtual image 45, i.e., the magnified image of the intermediate image 40 formed on the screen 15, due to the light reflected by the front windshield 50.

Hardware Configuration

Figure 2:
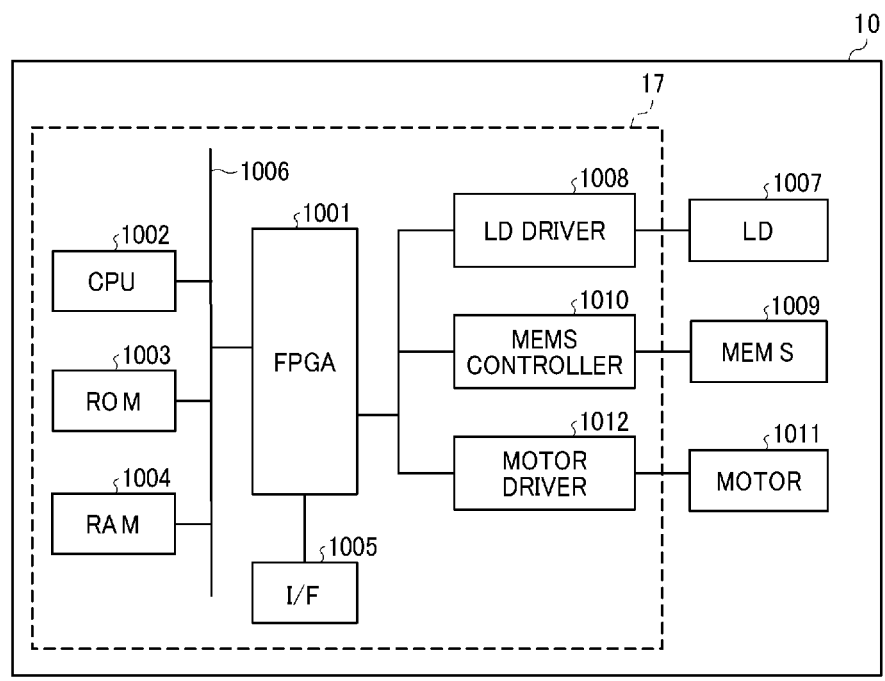
FIG. 2 is a diagram illustrating a hardware configuration of a display device according to the first embodiment of the present disclosure.

FIG. 2 is a diagram illustrating a hardware configuration of a display device according to the first embodiment of the present disclosure. The hardware configuration illustrated in FIG. 2 may be adopted in common among the embodiments of the present disclosure. Alternatively, some components or elements may be added to or deleted from the hardware configuration of FIG. 2.

The display device 10 includes a controller 17 that controls the operation of the display device 10. For example, the controller 17 is a circuit board or integrated circuit (IC) chip mounted inside the display device 10. The controller 17 includes a field-programmable gate array (FPGA) 1001, a central processing unit (CPU) 1002, a read only memory (ROM) 1003, a random access memory (RAM) 1004, an interface (I/F) 1005, a data bus line 1006, a laser diode (LD) driver 1008, a micro-electromechanical systems (MEMS) controller 1010, and a motor driver 1012.

The FPGA 1001 is an integrated circuit that is configurable by the designer of the display device 10. The LD driver 1008, the MEMS controller 1010, and the motor driver 1012 generate a driving signal according to the control signal output from the FPGA 1001. The CPU 1002 is an integrated circuit that controls the entirety of the display device 10. The ROM 1003 is a storage device that stores a program for controlling the CPU 1002. The RAM 1004 is a storage device that serves as a work area of the CPU 1002. The interface 1005 communicates with an external device. For example, the interface 1005 is coupled to the controller area network (CAN) of a vehicle.

For example, the LD 1007 is a semiconductor light-emitting element that configures a part of the light-source device 11. The LD driver 1008 is a circuit that generates a driving signal for driving the LD 1007. The MEMS 1009 configures a part of the light deflector 13 and moves the scanning mirror. The MEMS controller 1010 is a circuit that generates a driving signal for driving the MEMS 1009. A motor 1011 is an electric motor that rotates the rotation axis of the free-form surface mirror 30. The motor driver 1012 is a circuit that generates a driving signal for driving the motor 1011.

Functional Configuration

Figure 3:
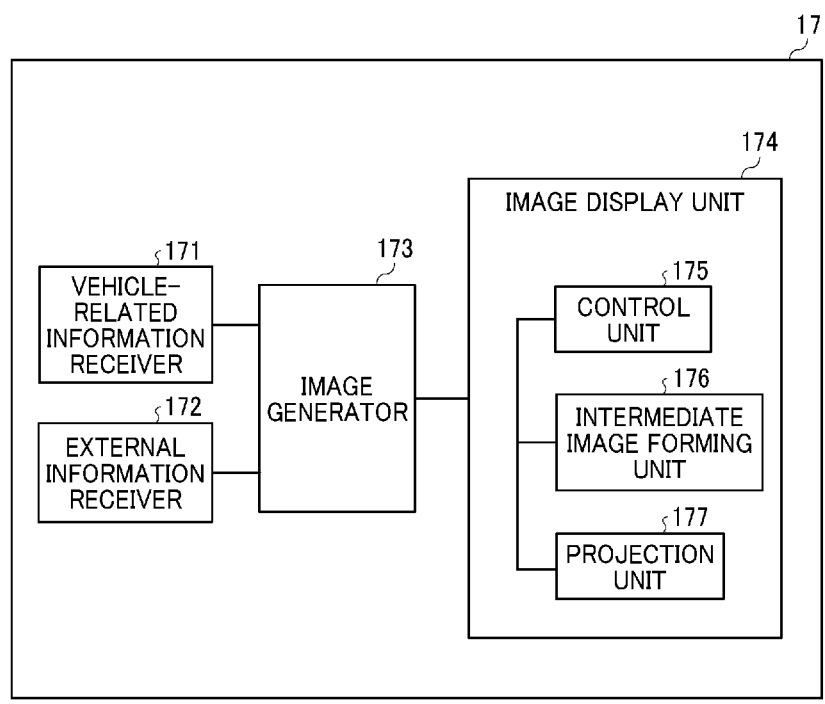
FIG. 3 is a diagram illustrating a functional configuration of a display device according to the first embodiment of the present disclosure.

FIG. 3 is a diagram illustrating a functional configuration the display device 10 according to the first embodiment of the present disclosure. The functions that are implemented by the display device 10 include a vehicle-related information receiver 171, an external information receiver 172, an image generator 173, and an image display unit 174.

The vehicle-related information receiver 171 is a function to receive vehicle-related information (e.g., speed and travel distance) from a controller area network (CAN) or the like. For example, the vehicle-related information receiver 171 is implemented by some of the elements illustrated in FIG. 2. In particular, the vehicle-related information receiver 171 may be implemented by the interface 1005, the processing performed by the CPU 1002, and a program stored in the ROM 1003.

The external information receiver 172 receives external information (for example, position information from the global positioning system (GPS), routing information from a navigation system, and traffic information) of the vehicle from an external network. For example, the external information receiver 172 is implemented some of the elements illustrated in FIG. 2. In particular, the external information receiver 172 may be implemented by the interface 1005, the processing performed by the CPU 1002, and a program stored in the ROM 1003.

The image generator 173 is a function to generate image data, which is used to display the intermediate image 40 and the virtual image 45, based on the data input from the vehicle-related information receiver 171 and the external information receiver 172. For example, the image generator 173 is implemented some of the elements illustrated in FIG. 2. In particular, the image generator 173 may be implemented by the processing performed by the CPU 1002 and a program stored in the ROM 1003.

The image display unit 174 is a function to form the intermediate image 40 on the screen 15 based on the image data generated by the image generator 173, and to project the laser beams (bundle of laser beams) that form the intermediate image 40 towards the front windshield 50 to display the virtual image 45. For example, the image display unit 174 is implemented some of the elements illustrated in FIG. 2. In particular, the image display unit 174 may be implemented by the processing performed by the CPU 1002, the FPGA 1001, the LD driver 1008, the MEMS controller 1010, and the motor driver 1012, as well as a program stored in the ROM 1003.

The image display unit 174 includes a control unit 175, an intermediate image forming unit 176, and a projection unit 177. In order to form the intermediate image 40, the control unit 175 generates a control signal used to control the operation of the light-source device 11 and the light deflector 13. Moreover, the control unit 175 generates a control signal that controls the operation of the free-form surface mirror 30 to display the virtual image 45 at a desired position.

The intermediate image forming unit 176 forms the intermediate image 40 on the screen 15 based on the control signal generated by the control unit 175. The projection unit 177, in order to form the virtual image 45 to be visually recognized by the viewer 3, projects the laser beams that form the intermediate image 40 towards the transmissive reflector (e.g., the front windshield 50).

Light-Source Device

Figure 4:
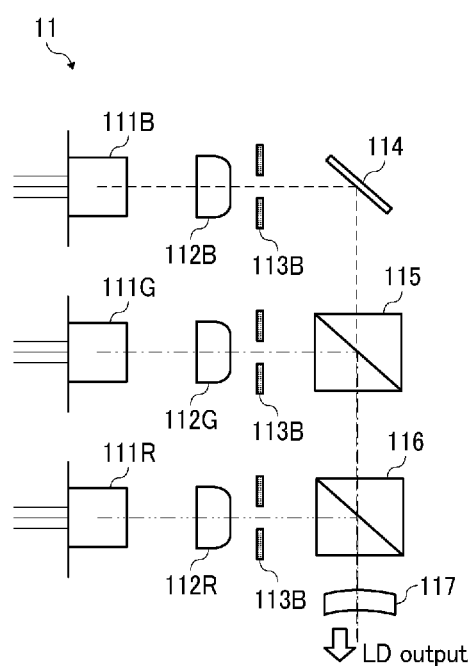
FIG. 4 is a diagram illustrating a specific configuration of a light-source device according to the first embodiment of the present disclosure.

FIG. 4 is a diagram illustrating a specific configuration of the light-source device 11 according to the first embodiment of the present disclosure. The light-source device 11 includes light-source elements 111R, 111G, and 111B (these light-source elements may be referred to simply as a light-source element 111 in the following description when it is not necessary to distinguish each of the light-source elements), coupling lenses 112R, 112G, and 112B, apertures 113R, 113G, and 113B, combiners 114, 115, and 116, and a lens 117.

For example, each of the light-source elements 111 R, 111 G, and 111B of three colors (R, G, B) of a laser diode (LD) having a single or a plurality of light-emitting points. The light-source elements 111R, 111G, and 111B emit bundles of laser beams (light flux) having different wavelengths $\lambda R$, $\lambda G$, and $\lambda B$, respectively. For example, $\lambda R=640$ nanometers (nm), $\lambda G=530$ nm, and $\lambda B=445$ nm.

The emitted bundles of laser beams (light flux) are coupled by the coupling lenses 112R, 112G, and 112B, respectively. The coupled bundles of laser beams (light flux) are shaped by the apertures 113R, 113G, and 113B, respectively. The shapes of the apertures 113R, 113G, and 113B may be various kinds of shape such as a circle, an ellipse, a rectangle, and a square depending on, for example, certain predetermined conditions such as the divergence angle of the bundles of laser beams (light flux).

The laser beams (light flux) that are shaped by the apertures 113R, 113G, and 113B are combined by the three combiners 114, 115, and 116, respectively. The combiners 114, 115, and 116 are plate-like or prismatic dichroic mirrors, and reflect or transmit the laser beams (light flux) therethrough according to the wavelength of the laser beams to combine the laser beams into one bundle of laser beams (light flux) that travels along one optical path. The combined bundle of laser beams passes through the lens 117 and is guided to the light deflector 13.

Light Deflector

Figure 5:
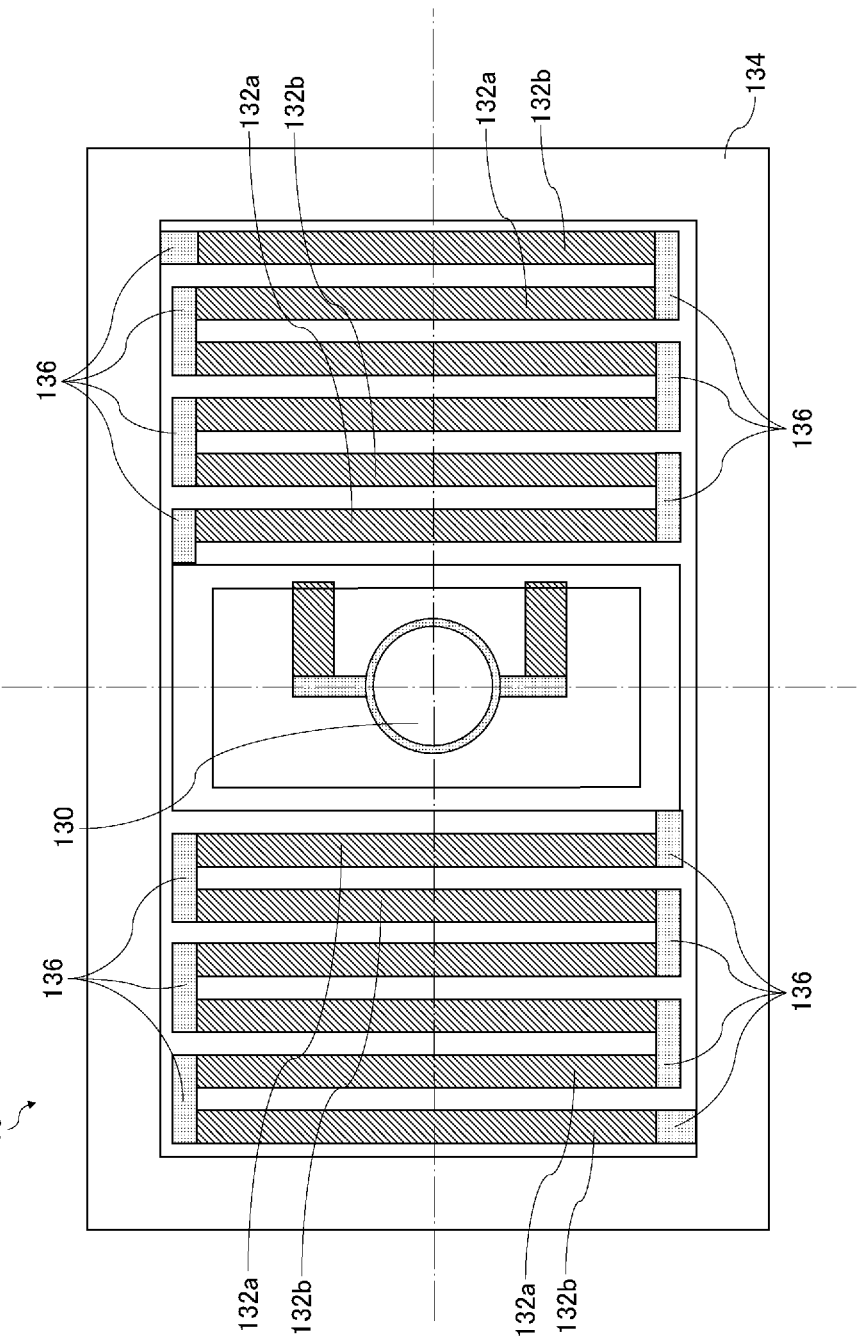
FIG. 5 is a diagram illustrating a specific configuration of a light deflector according to the first embodiment of the present disclosure.

FIG. 5 is a diagram illustrating a specific configuration of the light deflector 13 according to the first embodiment of the present disclosure. The light deflector 13 is a MEMS mirror produced by semiconductor processing, and includes a mirror 130, a serpentine beam 132, a frame 134, and a piezoelectric member 136. The light deflector 13 is an example of a scanner.

The mirror 130 has a reflection plane that reflects the laser beams emitted from the light-source device 11 towards the screen 15 side. In the light deflector 13, a pair of serpentine beams 132 are formed across the mirror 130. Each of the pair of serpentine beams 132 has a plurality of turning portions. Each of these turning portions is configured by a first beam 132a and a second beam 132b that are arranged alternately. Each of the pair of serpentine beams 132 is supported by the frame 134. The piezoelectric member 136 is disposed such that the first beam 132a and the second beam 132b, which are adjacent to each other, are coupled to each other. The piezoelectric member 136 applies different levels of voltage to the first beam 132a and the second beam 132b to bend each of the first beam 132a and the second beam 132b differently.

As a result, the first beam 132a and the second beam 132b, which are adjacent to each other, bend in different directions. As the bending force is accumulated, the mirror 130 rotates in the vertical direction around the horizontal axis. Due to such a configuration as above, the light deflector 13 can perform optical scanning in the vertical direction at a low voltage. An optical scanning in the horizontal direction around the axis in the vertical direction is implemented by the resonance produced by a torsion bar or the like coupled to the mirror 130.

Screen

Figure 6:
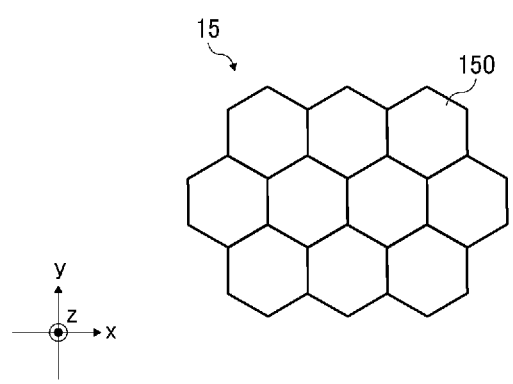
FIG. 6 is a diagram illustrating a specific configuration of a screen according to the first embodiment of the present disclosure.

FIG. 6 is a diagram illustrating a specific configuration of the screen 15 according to the first embodiment of the present disclosure. The laser beams emitted from the LD 1007 that configures a part of the light-source device 11 form an image on the screen 15. The screen 15 serves as a divergent part that diverges the laser beams at a predetermined divergence angle. The screen 15 as illustrated in FIG. 6 has a microlens-array structure in which a plurality of hexagonal-shaped microlenses 150 are arranged with no gap therebetween. The width of each of the microlenses 150 (the distance between two sides that face each other) is approximately 200 micrometer ($\mu$m). As the microlenses 150 of the screen 15 have a hexagonal shape, the multiple microlenses 150 can be arrayed with high density.

Note that the shape of each of the microlenses 150 is not limited to a hexagonal shape. For example, in some embodiments, the microlenses 150 have a rectangular shape or a triangular shape. In the present embodiment, structure in which the multiple microlenses 150 are arrayed in a regularized manner is described. However, no limitation is intended thereby, and the arrangement of the microlenses 150 is not limited to this structure. For example, the centers of the multiple microlenses 150 may be decentered from each other, and the microlenses 150 may be arranged in an irregular manner. When such a decentered arrangement is adopted, those multiple microlenses 150 have different shapes from each other.

Figure 7A:
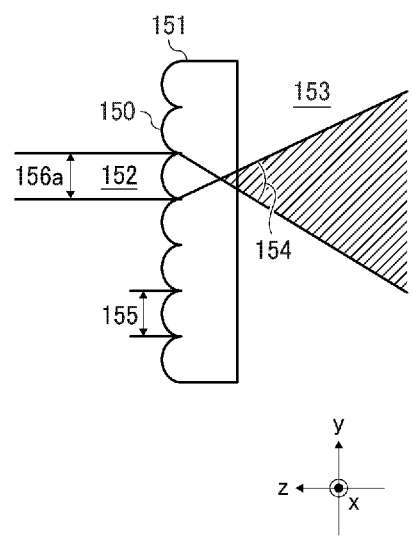
FIGS. 7A and 7B are diagrams illustrating a difference in operation due to differences in sizes of the diameter of incident light flux and the lens diameter in a microlens array, according to an embodiment of the present disclosure.

FIGS. 7A and 8B are diagrams illustrating a difference in operation due to differences in sizes of the diameter of incident light flux and the lens diameter in a microlens array, according to the related art. In FIG. 7A, the screen 15 is configured by an optical plate 151 in which the multiple microlenses 150 are neatly arranged. When an incident light 152 is scanned on the optical plate 151, the incident light 152 is dispersed by the microlenses 150 and become a diverging light 153. Due to the structure of the microlenses 150, the screen 15 can disperse the incident light 152 at a desired divergence angle 154. The intervals 155 at which the microlenses 150 are arranged is designed to be wider than the diameter 156a of the incident light 152. Accordingly, the screen 15 does not cause interference among the lenses and does not cause speckles (speckle noise).

Figure 7B:
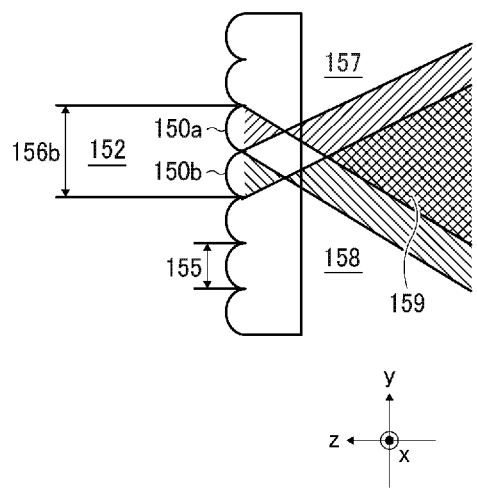

FIG. 7B is a diagram illustrating the optical paths of diverging lights when the diameter 156b of the incident light 152 is twice wider than the intervals 155 at which the microlenses 150 are arranged. The incident light 152 is incident on two microlenses 150a and 150b, and these two microlenses 150a and 150b produce two diverging lights 157 and 158, respectively. In such cases, two diverging lights exist in an area 159, and thus lights may interfere with each other. Such an interference between two diverging lights (coherent light) is visually recognized as a speckle by an observer.

In view of the above circumstances, in order to reduce the number of speckle patterns the intervals 155 at which the microlenses 150 are arranged is designed to be wider than the diameter 156 (156a, 156b) of the incident light 152. A configuration with convex lenses are described as above with reference to FIG. 7A and FIG. 7B. However, no limitation is indicated thereby, and a similar situation is expected in a configuration with concave lenses.

Figure 8:
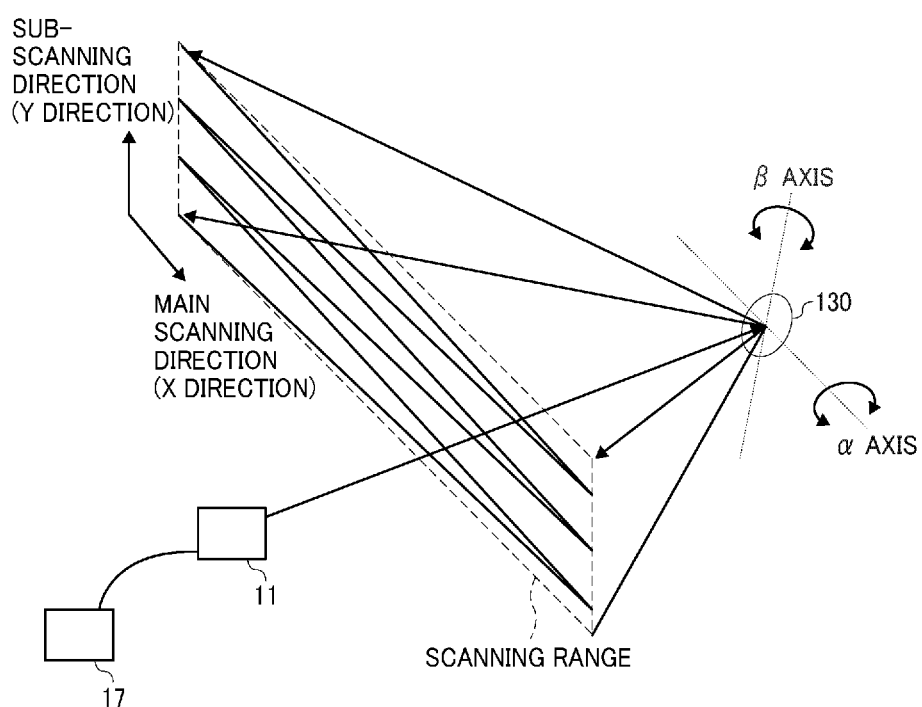
FIG. 8 is a diagram illustrating the relation between a mirror of a light deflector and the scanning range, according to an embodiment of the present disclosure.

FIG. 8 is a diagram illustrating the relation between a mirror of the light deflector 13 and the scanning range, according to the present embodiment of the present disclosure. The FPGA 1001 controls the light-emission intensity, the timing of light emission, and the light waveform of the multiple light-source elements in the light-source device 11. The LD driver 1008 drives the multiple light-source elements of the light-source device 11 to emit laser beams. As illustrated in FIG. 8, the laser beams that are emitted from the multiple light-source elements and whose optical paths are combined are two-dimensionally deflected about the α axis and the β axis by the mirror 130 of the light deflector 13, and the screen 15 is irradiated with the laser beams deflected by the mirror 130, which serve as scanning beams. In other words, the screen 15 is two-dimensionally scanned by main scanning and sub-scanning by the light deflector 13.

In the present embodiment, the entire area to be scanned by the light deflector 13 may be referred to as a scanning range. The scanning beams scan (two-way scans) the scanning range of the screen 15 in an oscillating manner in the main scanning direction (X-axis direction) at a high frequency of about 20,000 to 40,000 hertz (Hz), and one-way scan the scanning range of the screen 15 in the sub-scanning direction (Y-axis direction) at a low frequency of about a few tens of Hz. In other words, the light deflector 13 performs raster scanning on the screen 15. In this configuration, the display device 10 controls the light emission of the multiple light-source elements according to the scanning position (the position of the scanning beam). Accordingly, an image can be drawn on a pixel-by-pixel basis and a virtual image can be displayed.

As described above, the sub-scanning cycle is about a few tens of Hz. Accordingly, the length of time to draw an image of one frame, i.e., the length of time to scan one frame (one cycle of two-dimensional scanning) is a few tens of millisecond (msec). For example, assuming that the main-scanning cycle and the sub-scanning cycle are 20,000 Hz and 50 Hz, respectively, the length of time to scan one frame is 20 msec.

Figure 9:
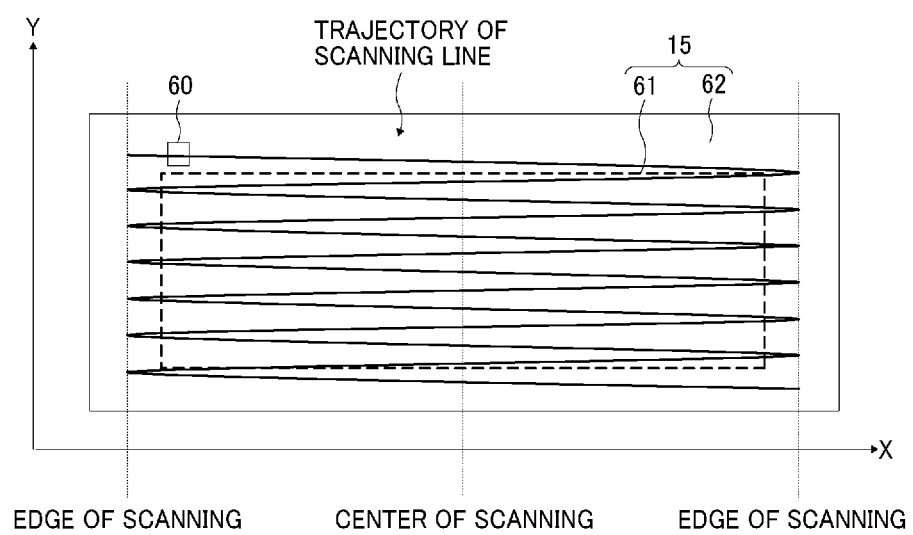
FIG. 9 is a diagram illustrating the trajectory of a scanning line when two-dimensional scanning is performed, according to an embodiment of the present disclosure.

FIG. 9 is a diagram illustrating the trajectory of a scanning line when two-dimensional scanning is performed, according to the present embodiment. As illustrated in FIG. 9, the screen 15 includes an image area 61 (i.e., an effective scanning area) and a frame area 62 that surrounds the image area 61. The image area 61 is irradiated with the light that is modulated according to the image data, and the intermediate image 40 is drawn on the image area 61.

In the present embodiment, the scanning range includes the image area 61 and a part of the frame area 62 (i.e., a portion around the periphery of the image area 61) on the screen 15. In FIG. 9, the trajectory of the scanning line in the scanning range is indicated by a zigzag line. For the sake of explanatory convenience, the number of scanning lines in FIG. 9 is less than the actual number of scanning lines.

For example, the screen 15 may be configured by a transmissive optical element such as a microlens array that diffuses light. In the present embodiment, the shape of the image area 61 is rectangular or planar. However, no limitation is intended thereby, and the shape of the image area 61 may be polygonal or curved. Alternatively, in some embodiments, the screen 15 may be a flat plate or curved plate that does not diffuse light. Further, in some embodiments, the image area 61 may be a reflective element such as a micromirror array that diffuses light, depending on the design or layout of the display device 10.

The screen 15 is provided with a synchronous detection system 60 that includes a photoreceptor disposed at the edges of the image area 61 (a part of the frame area 62) in the scanning range. In FIG. 9, the synchronous detection system 60 is disposed on the −X and +Y side of the image area 61. More specifically, the synchronous detection system 60 is disposed at a corner on the +Y side. The synchronous detection system 60 detects the operation of the light deflector 13 and outputs, to the FPGA 1001, a synchronizing signal that determines the start timing of scanning or the end timing of scanning.

Detail

The optical design of the display system 1A according to the first embodiment of the present disclosure is described below with reference to FIGS. 10 to 14. Firstly, the relation between the divergence angle of the diverging light dispersing from the screen 15 and the intensity is described with reference to FIGS. 10A and 10B.

Figure 10A:
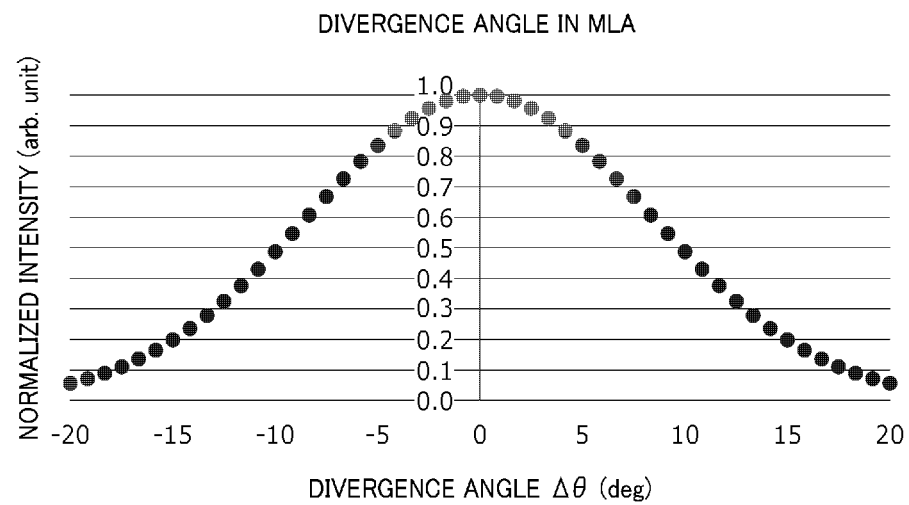
FIGS. 10A and 10B are diagrams illustrating the relation between the divergence angle of the diverging light dispersing from a screen and the intensity, according to an embodiment of the present disclosure.

FIG. 10A is a diagram illustrating the intensity distribution of the bundles of laser beams dispersed by the screen 15, according to the present embodiment. The horizontal axis in FIG. 10A indicates the divergence angle Δθ of the diverging light on the screen 15 with reference to the bundles of laser beams incident on the screen 15. As illustrated in FIG. 10A, the normalized intensity with reference to the divergence angle Δθ has an intensity profile of the Gaussian distribution specific to laser beams. In the present embodiment, the divergence angle Δθ indicates the difference in angle between the incident angle at which the light beam is incident on the screen 15 and the center point of the divergence angle of the diverging light that reaches the location of the eyepoint of the viewer 3 as the incident light is dispersed by the screen 15.

Figure 10B:
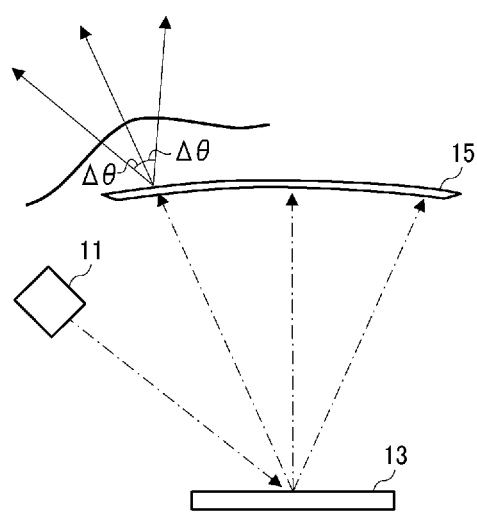

As illustrated in FIG. 10B, as the divergence angles Δθ with reference to the bundles of laser beams that are incident on both edges of the intermediate image 40 formed on the screen 15 increases, the intensity of the diverging light decreases. When the intensities of the diverging lights on both edges of the intermediate image 40 decrease, the brightness of the virtual image 45 around these edges decreases. As a result, inplane deterioration occurs on the virtual image 45 that is visually recognized by the viewer 3.

In the present embodiment, an optimal optical design of the display device 10 is suggested that prevents reduction in brightness at the edge of the virtual image 45 that the viewer 3 visually recognizes and enables the viewer 3 to visually recognize the virtual image 45 with a sufficient brightness distribution.

Figure 11:
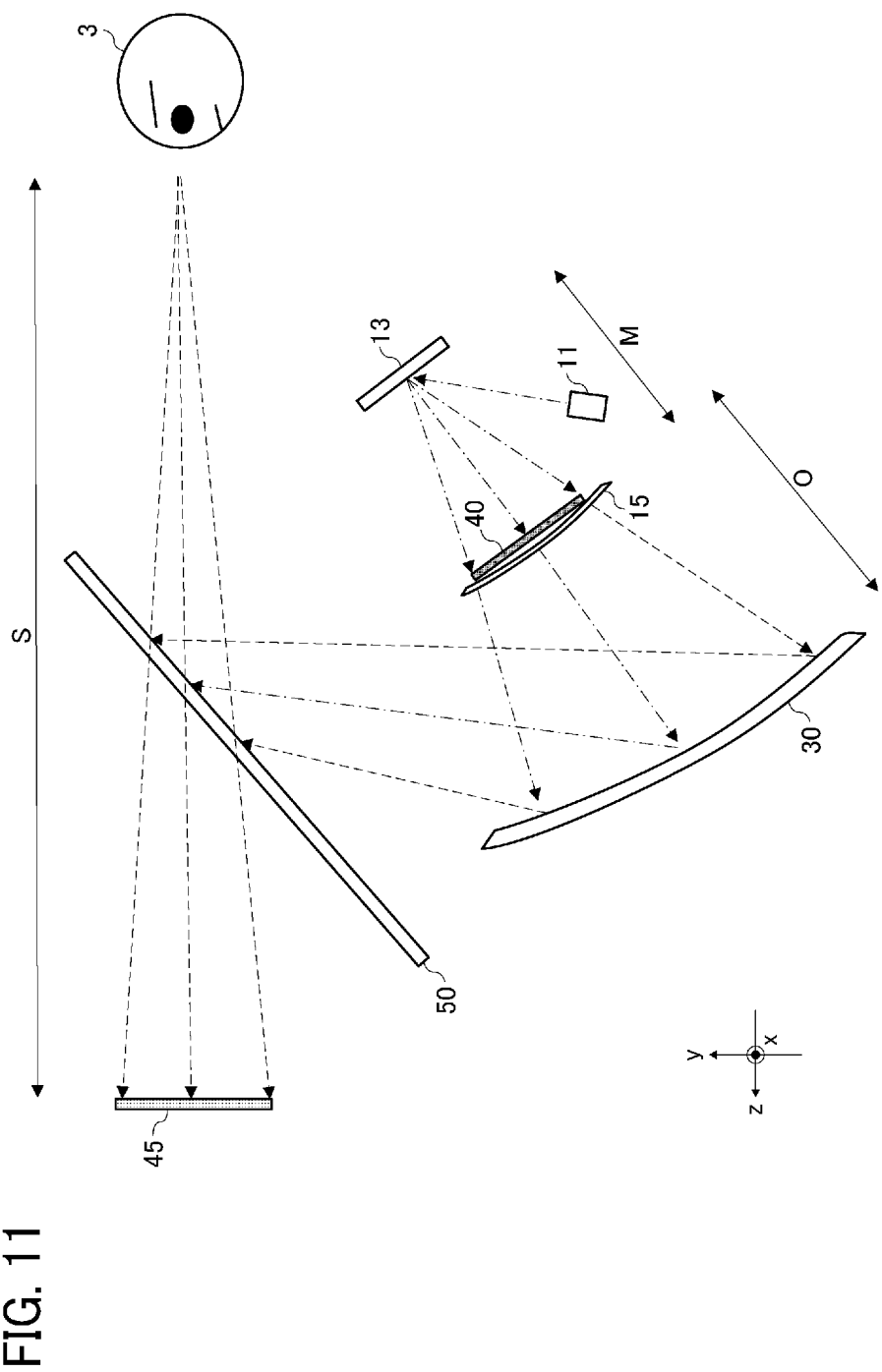
FIG. 11 is a schematic diagram illustrating the optical path length in a display system according to the first embodiment of the present disclosure.

FIG. 11 is a schematic diagram illustrating the optical path length in the display system 1A according to the first embodiment of the present disclosure. In the present embodiment, each optical path length in the multiple elements of the display system 1A is measured using the path of the light that passes through the center of the image when an object is observed from the center of an eyelips (reference eyepoint). In the present embodiment, it is assumed that the center of the image matches the geometric center in each of the elements. Note that the center of an eyelips (reference eyepoint) indicates the reference location of the eyepoint of the viewer 3, and indicates the center of the eye box.

The viewer 3 (for example, the driver who drives a vehicle) visually recognizes the virtual image 45 from an eye box (i.e., an area near the eyes of the viewer 3) in the optical path of the light that is reflected by the front windshield 50. Here, the term "eye box" indicates the area in which the viewer 3 can visually recognize the virtual image 45 without adjusting the location of the eyepoint. In particular, the range of the eye box is equal to or less than "the eye range of a car driver" (Japanese Industrial Standards (JIS) D 0021). The eye box is set as the area through which the driver can visually recognize the virtual image 45, based on the eyelips that is a region of space in which the eyepoint of the driver seated on a seat can exist.

In the display system 1A, the optical path length between the reference eyepoint of the viewer 3 and the center of the virtual image 45 is defined as optical path length S.

The optical path length between the light deflector 13 and the center of the intermediate image 40 formed on the screen 15 is defined as optical path length M. The optical path length between the center of the intermediate image 40 formed on the screen 15 and the center of the area through which the bundles of laser beams dispersed from the intermediate image 40 pass through the free-form surface mirror 30 is defined as optical path length O.

Figure 12:
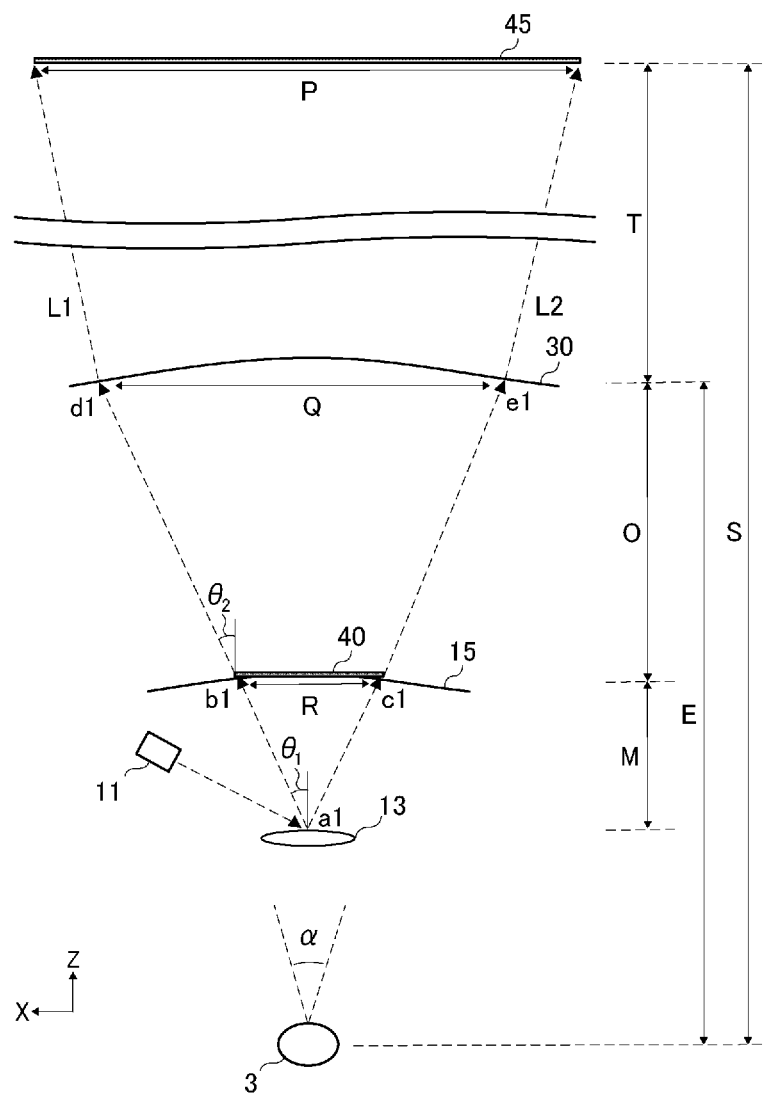
FIG. 12 is a schematic diagram illustrating the relative positions of the elements in a display system according to the first embodiment of the present disclosure.

FIG. 12 is a schematic diagram illustrating the relative positions of the elements in the display system 1A according to the first embodiment of the present disclosure. For the sake of explanatory convenience, it is assumed in FIG. 12 that the elements of the system are arranged in parallel on the XZ plane. However, no limitation is indicated thereby, and in actuality, it is not necessary for the elements of the system to be arranged parallel to the XY plane as illustrated in FIG. 11.

The optical path length between the reference eyepoint of the viewer 3 and the center of the area through which the bundles of laser beams dispersed from the intermediate image 40 pass through the free-form surface mirror 30 is defined as an optical path length E. Further, the optical path length between the center of the area through which the bundles of laser beams dispersed from the intermediate image 40 pass through the free-form surface mirror 30 and the center of the virtual image 45 is defined as an optical path length T.

The bundles of laser beams generated by the light-source device 11 are incident on a point a1 of the light deflector 13, and are two-dimensionally scanned on the screen 15 as deflected by the light deflector 13. The screen 15 forms the intermediate image 40 with a width R in the X-axis direction (main scanning direction).

When the intermediate image 40 at an edge in the +X-direction is to be formed, the bundles of laser beams emitted from the light-source device 11 are deflected by the light deflector 13 in the +X-direction, and a portion of the intermediate image 40 is drawn at a point b1. When the intermediate image 40 at an edge in the −X-direction is to be formed, the bundles of laser beams emitted from the light-source device 11 are deflected by the light deflector 13 in the −X-direction, and a portion of the intermediate image 40 is drawn at a point c1. The image that is drawn on the screen 15 is configured by the image generator 173 of the controller 17.

As described above, the screen 15 is provided with a light dispersing member such as a microlens array, and in the present embodiment, the microlens array makes up the screen 15. The bundles of laser beams that scan the screen 15 are dispersed at a predetermined divergence angle as passing through the screen 15. In FIG. 12, the laser beams that are emitted from the screen 15 indicate the central light beam of the diverging light. The bundles of laser beams that are emitted from the screen 15 are incident on the free-form surface mirror 30. Q denotes the band pass of the bundles of laser beams on the free-form surface mirror 30.

When an image at an edge in the +X-direction is to be formed in such a configuration as above, the central light beam of the diverging light is incident on a point d1 of the free-form surface mirror 30. When an image at an edge in the −X-direction is to be formed, the central light beam of the diverging light is incident on a point e1 of the free-form surface mirror 30. In other words, the point a1 at which the bundles of laser beams emitted from the light-source device 11 to the light deflector 13 is incident on the light deflector 13 can be regarded as the point of intersection of the extension of a line connecting the point b1 to the point d1 projected on the XZ plane and the extension of a line connecting the point c1 to the point e1 projected on the XZ plane. In this configuration, the optical path length M as illustrated in FIG. 11 and FIG. 12 can be regarded as the optical path length between the point a1 and the intermediate image 40.

The plane of the free-form surface mirror 30 is designed and shaped so as to reduce the optical strain that occurs on the front windshield 50. The bundles of laser beams that have passed through the free-form surface mirror 30 are then incident on the front windshield 50, and reach at least one point of the location of the eyepoint within an eyelips area including the reference eyepoint of the viewer 3. The bundles of laser beams that are incident on the front windshield 50 are reflected according to the shape of the surface of the front windshield 50.

In the display system 1A, it is desired that the divergence angle Δθ(θ2−θ1) of the diverging light on the screen 15 with reference to the bundles of laser beams incident on the screen 15 be narrow, such that the bundles of laser beams efficiently diverge in the eyelips area that the viewer 3 can visually recognize to improve the brightness at the edge of the image. In other words, in the display system 1A as illustrated in FIG. 12, it is desired that the triangle that is defined by points a1, b1, and c1 be similar to the triangle that is defined by points a1, d1, and e1.

When it is assumed in FIG. 12 that the triangle that is defined by points a1, b1, and c1 is similar to the triangle that is defined by points a1, d1, and e1, second equations given below hold true.

Second Equation $M:R=(M+O):Q$ $M \times Q = (M+O) \times R$ [Math.2]

When it is assumed that the angle of view that the viewer 3 form with the virtual image 45 is α, the band pass Q of the bundles of laser beams on the free-form surface mirror 30 and the width P of the virtual image 45 in the X-axis direction can be expressed in the following third and fourth equations, respectively. In the present embodiment, the curvature of the front windshield 50 is very small. Accordingly, it is assumed that the free-form surface mirror 30 is only the element with an optical power in the optical path between the screen 15 and the viewer 3.

Third Equation $$Q = E \times \tan \alpha \qquad [\text{Math.3}]$$

Fourth Equation $$P = S \times \tan \alpha \qquad [\text{Math.4}]$$

In view of the relational expression related to the magnifying power of an optical system, the equation P/R=T/O holds true. In view of this equation, the fourth equation as above may be modified on an approximate basis to obtain a fifth equation as follows for the width R of the intermediate image 40.

Fifth Equation $$R = (S \times O \times \tan \alpha)/T \qquad [\text{Math.5}]$$

In view of relational expressions as above, the second equation as above may be modified to obtain a sixth equation as follows.

Fifth Equation $$S \times O \times (M+O)/(T \times E \times M) = 1 \qquad [\text{Math.6}]$$

Accordingly, in the display system 1A, the optical path length is determined so as to satisfy the similarity relationship in the sixth equation as above where the similarity relationship between the triangle that is defined by points a1, b1, and c1 and the triangle that is defined by points a1, d1, and e1 holds true.

Further, it is desired that the intensity of the diverging light on the screen 15 be approximately equal to or higher than a half value, such that the bundles of laser beams efficiently diverge in the eyelips area (eye box) that the viewer 3 can visually recognize. For this reason, it is desired that the intensity of the diverging light on the screen 15, as illustrated in FIG. 10A, be set to equal to or higher than 0.5. In other words, the allowance for the divergence angle Δθ of the diverging light on the screen 15 with reference to the bundles of laser beams incident on the screen 15 is as follows. Δθ≤±10°

The results of optical design simulation (computation of ranges) within the range of Δθ≤±10° for the divergence angle Δθ in the display device 10 are described below. The inventors of the present disclosure uses the parameters for each optical path length as expressed in the above sixth equation, and calculated and obtained the conditions that correspond to the allowance for the divergence angle Δθ (Δθ≤±10°). As depicted in Table 1 and Table 2, when the divergence angle Δθ=10° and Δθ=−10°, the optical path length M (i.e., the optical path length between the light deflector 13 and the center of the intermediate image 40 formed on the screen 15 is made variable, and fixed values are applied to the other parameters.

TABLE 1

| Δθ = −10° | |
|---|---|
| S | 4920 |
| O | 360 |
| T | 4351 |

TABLE 1-continued

| Δθ = −10° | |
|---|---|
| M | 53.76 |
| E | 1611.6 |
| α | 5° |
| P | 430.4 |
| R | 35.61 |
| Q | 141 |

TABLE 2

| Δθ = −10° | |
|---|---|
| S | 4920 |
| O | 360 |
| T | 4351 |
| M | 100000 (NO LIMIT) |
| E | 1611.6 |
| α | 5° |
| P | 430.4 |
| R | 35.61 |
| Q | 141 |

When the parameters in Table 1 and Table 2 are applied to the similarity relationship expressed in the sixth equation, the condition as expressed in the first equation given below can be obtained.

First Equation $$S \times O \times (M+O)/(T \times E \times M) \leq 1.95 \qquad [\text{Math.7}]$$

In the display system 1A, the layout of each optical system is optimized so as to satisfy the condition in the above first equation. Due to this configuration, prevents reduction in brightness at the edge of an image that is visually recognized by a viewer 3 (i.e., a virtual image 45) and reduction in brightness when the viewer 3 moves his/her location of the eyepoint, and enables the viewer 3 to visually recognize an image with a sufficient brightness distribution.

Figure 13:
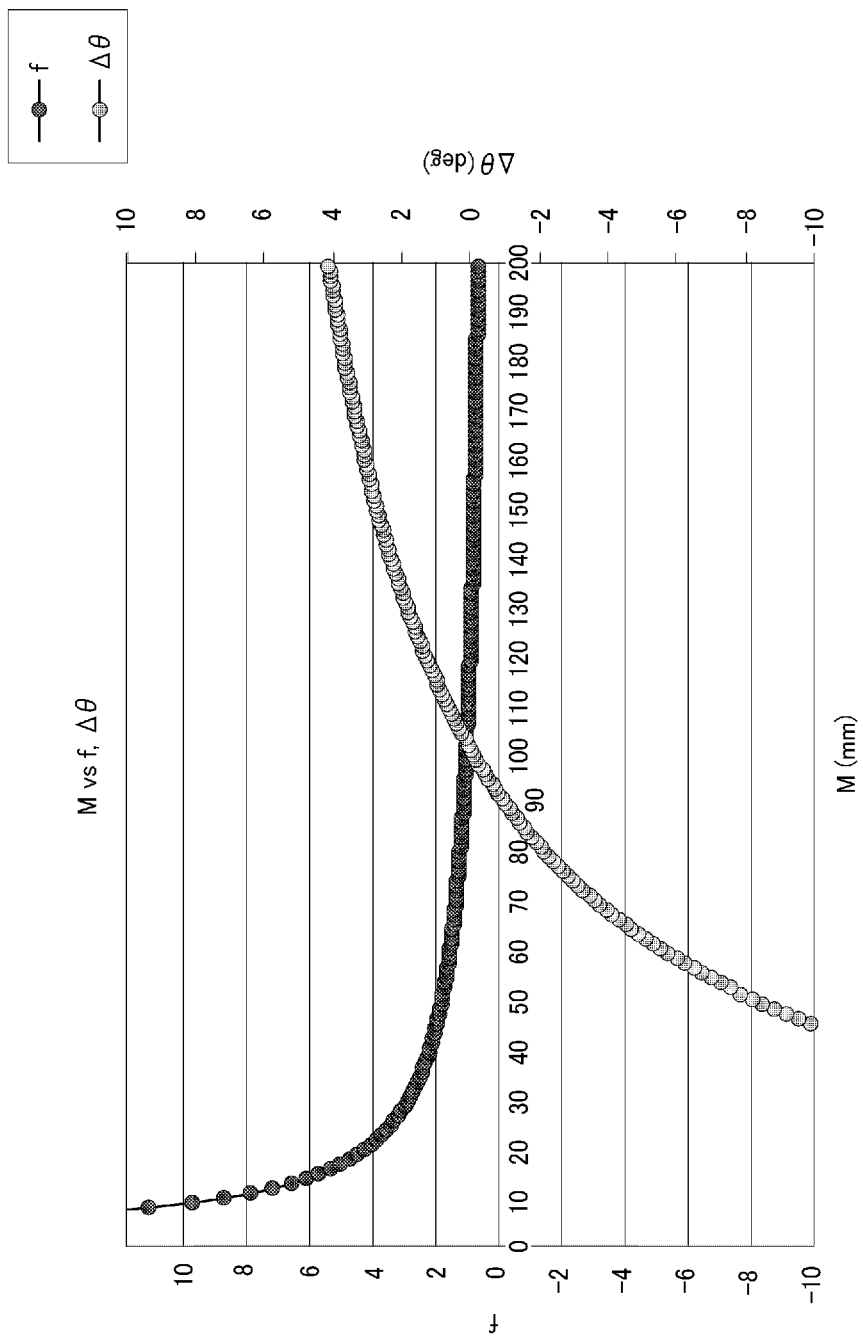
FIG. 13 is a diagram illustrating the relation between the optical path length between a light deflector and the center of an intermediate image and other parameters, according to an embodiment of the present disclosure.

FIG. 13 is a diagram illustrating the relation between the optical path length M between the light deflector 13 and the center of the intermediate image 40 and other parameters, according to the present embodiment. In FIG. 13, f denotes the left side of the first or sixth equation, i.e., "S×O×(M+O)/(T×E×M)." As described above, Δθ indicates the divergence angle (θ2−θ1) of the divergence angle of the diverging light on the screen 15 with reference to the bundles of laser beams incident on the screen 15.

As depicted in FIG. 13, as the value of f gets close to 1, or as Δθ gets closes to 0, the similarity relationship between the triangle that is defined by points a1, b1, and c1 and the triangle that is defined by points a1, d1, and e1 holds true.

As illustrated in FIG. 13, as the optical path length M between the light deflector 13 and the center of the intermediate image 40 increases, θ1 also increases. Accordingly, the divergence angles Δθ also increases. On the other hand, as the optical path length M between the light deflector 13 and the center of the intermediate image 40 increases, the value of f decreases. In the present embodiment, the value of M where each of Δθ and f is optimized about 105 millimeters (mm), which is indicated by a point of intersection where Δθ intersects with fin the graph illustrated in FIG. 13.

In a similar manner to the condition in the first equation as above, when the permissible ranges of the values for Δθ and f in view of the layout of each optical system are taken in consideration, it is desired that the optical path length M between the light deflector 13 and the center of the intermediate image 40 be around 80 to 120 mm. The display device 10 uses such a value for M to calculate and obtain the other parameters. Accordingly, optimal optical design of the display device 10 is enabled.

The XYZ axes may be changed in view of the layout when implemented in a vehicle. In the above description, only the X-axis direction is referred to. However, no limitation is indicated thereby, and the condition in the first equation may be applied to the Y-axis direction in a similar manner.

In the display system 1A, the free-form surface mirror 30 is the only reflector. However, no limitation is intended thereby. For example, when a plurality of optical elements are used, in the display system 1A, the condition in the first equation may be satisfied in terms of a system configured by each one of the elements.

Effects of First Embodiment

As described above, the display system 1A according to the first embodiment of the present disclosure includes the light deflector 13 that scans the light beams that are emitted from the light-source device 11 (an example of a light source) in the main scanning direction and the sub-scanning direction orthogonal to the main scanning direction to form the intermediate image 40 on the screen 15 (i.e., an example of optical element), the screen 15 that disperses the light, the front windshield 50 (an example of a reflector) that reflects the diverging light diverging from the screen 15, and the free-form surface mirror 30 (an example of an imaging optical system) that projects the diverging light diverging from the screen 15 towards the screen 15 to form the virtual image 45. The screen 15 is arranged such that the condition in the first equation as given below is satisfied.

First Equation $$S \times O \times (M+O)/(T \times E \times M) \le 1.95 \quad \text{[Math.8]}$$

In the first equation as above, S denotes the distance between the location of the eyepoint of the viewer 3 of the virtual image 45 and the virtual image 45, and E denotes the distance between the location of the eyepoint of the viewer 3 of the virtual image 45 and the free-form surface mirror 30 that uses the diverging light to form the virtual image 45. M denotes the distance between the light deflector 13 and the center of the intermediate image 40, and O denotes the distance between the intermediate image 40 and the free-form surface mirror 30. T denotes the distance between the virtual image 45 and the free-form surface mirror 30. Note also that the distance indicates the length of the optical path that passes through the center of the image formed by the above light when an object is observed from a reference eyepoint.

Due to this configuration, the optical path length that is a specification value of the system can be optimized in view of the brightness distribution. Accordingly, the display system 1A can prevent reduction in brightness at the edge of the virtual image 45 that is visually recognized by a viewer 3 and reduction in brightness when the viewer 3 moves his/her location of the eyepoint, and enable the viewer 3 to visually recognize an image with a sufficient brightness distribution.

Second Embodiment

A display system 1B according to a second embodiment of the present disclosure is described below. Note that like reference signs are given to like elements or functions similar to those described as above in the first embodiment, and their detailed description is omitted. The display system 1B according to the second embodiment of the present disclosure adopts a panel projection system instead of the laser scanning system of the first embodiment as described above. The display system 1B according to the present embodiment is provided with a liquid crystal panel 14 as a divergent part, instead of the screen 15.

Figure 14:
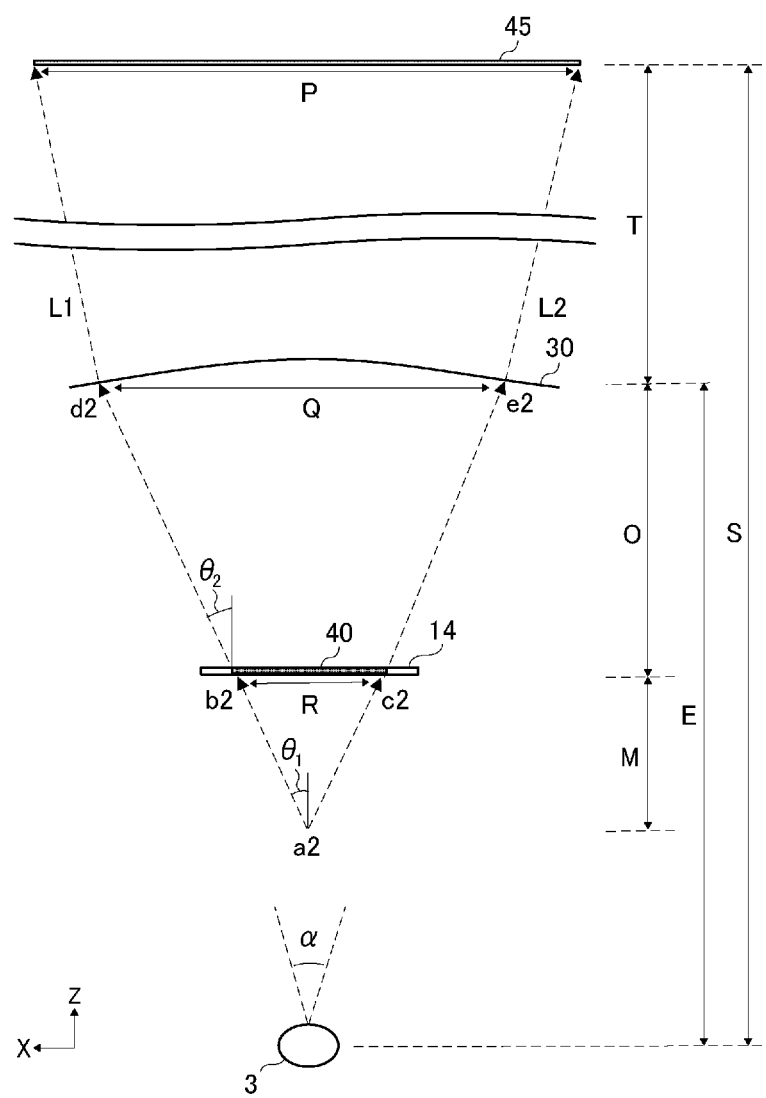
FIG. 14 is a schematic diagram illustrating the relative positions of the elements in a display system according to a second embodiment of the present disclosure.

FIG. 14 is a schematic diagram illustrating the relative positions of the elements in the display system 1B according to the second embodiment of the present disclosure. Each optical path length in FIG. 14 is equivalent to the corresponding optical path length defined in the first embodiment as described above.

The display system 1B that adopts a panel projection system uses, for example, an imaging device such as the liquid crystal panel 14 to form the intermediate image 40. In other words, the display device according to the second embodiment of the present disclosure is not provided with the light deflector 13. As illustrated in FIG. 14, the liquid crystal panel 14 forms the intermediate image 40 where the edges in the +X-direction and the −X-direction are b2 and c2, respectively.

The light beams that are emitted from the liquid crystal panel 14 are incident on the free-form surface mirror 30. In this configuration, the light beam that forms the edge (point b2) of the intermediate image 40 in the +X-direction is incident on a point d2 of the free-form surface mirror 30. On the other hand, the light beam that forms the edge (point c2) of the intermediate image 40 in the −X-direction is incident on a point e2 of the free-form surface mirror 30. The light beams that are emitted from the liquid crystal panel 14, as illustrated in 14, indicate the central light beam of the diverging light.

The plane of the free-form surface mirror 30 is designed and shaped so as to reduce the optical strain that occurs on the front windshield 50. The light beams that are incident on the free-form surface mirror 30 are reflected according to the shape of the plane of the free-form surface mirror 30. The bundles of laser beams L1 and L2 that are reflected by the free-form surface mirror 30 are then incident on the front windshield 50, and reach at least one point of the location of the eyepoint within an eyelips area including the center of the eyelips (reference eyepoint).

In the optical path of the light beams diverging from the edges (points b2 and c2) of the intermediate image 40 to at least a part of the eyelips area, the points on the free-form surface mirror 30 that correspond to the bundles of laser beams that are emitted from the points b2 and c2 are points d2 and e2, respectively. The extension of a line connecting the point b2 to the point d2 projected on the XZ plane intersects with the extension of a line connecting the point c2 to the point e2 projected on the XZ plane at a point a2. For this reason, in a similar manner to the first embodiment, the optical path length M in the display device according to the second embodiment of the present disclosure is the optical path length between the center of the intermediate image 40 and the point a2 at which the extension of a line connecting the point b2 to the point d2 projected on the XZ plane intersects with the extension of a line connecting the point c2 to the point e2 projected on the XZ plane.

In this configuration, in a similar manner to the first embodiment of the present disclosure as described above, the similarity relationship between the shape that is defined by points a2, b2, and c2 and the shape that is defined by points a2, d2, and e2 holds true when the condition in the first equation is satisfied. The bundles of laser beams that are to form an edge of the image that is visually recognized by the viewer 3 may be optically designed so as to satisfy the first equation. Due to this configuration, the bundles of laser beams can efficiently be dispersed towards the eyelips area. Accordingly, in the display system 1B, reduction in brightness at an edge of the image can be prevented.

The XYZ axes as illustrated in FIG. 14 may be changed in view of the layout when implemented in a vehicle. In FIG. 14, only the XZ plane is referred to. However, no limitation is indicated thereby, and system design may be conducted using a similar relational expression also in the Y-axis direction. As illustrated in FIG. 14, an example configuration in which the free-form surface mirror 30 is the only reflector has been described. However, no limitation is intended thereby. For example, when a plurality of optical elements are used as a reflector, system design may be conducted so as to satisfy the relational expression according to the present embodiment in terms of a system configured by each one of the elements.

Effects of Second Embodiment

As described above, the display system 1B according to the second embodiment of the present disclosure adopts the projection system of the panel system where the liquid crystal panel 14 is used as the screen 15. As the display system 1B satisfies the condition in the first equation in the panel system, the optical path length that is a specification value of the system can be optimized in view of the brightness distribution. Accordingly, in the display system 1B, prevent reduction in brightness at the edge of the virtual image 45 that is visually recognized by a viewer 3 and reduction in brightness when the viewer 3 moves his/her location of the eyepoint, and enable the viewer 3 to visually recognize an image with a sufficient brightness distribution.

Third Embodiment

A display system 1C according to a third embodiment of the present disclosure is described below. Note that like reference signs are given to like elements or functions similar to those described as above in the first embodiment, and their detailed description is omitted. In the laser scanning system of the first embodiment as described above, the display system 1C according to the third embodiment of the present disclosure is provided with a concave mirror 16 in the optical path between the light deflector 13 and the screen 15.

Figure 15:
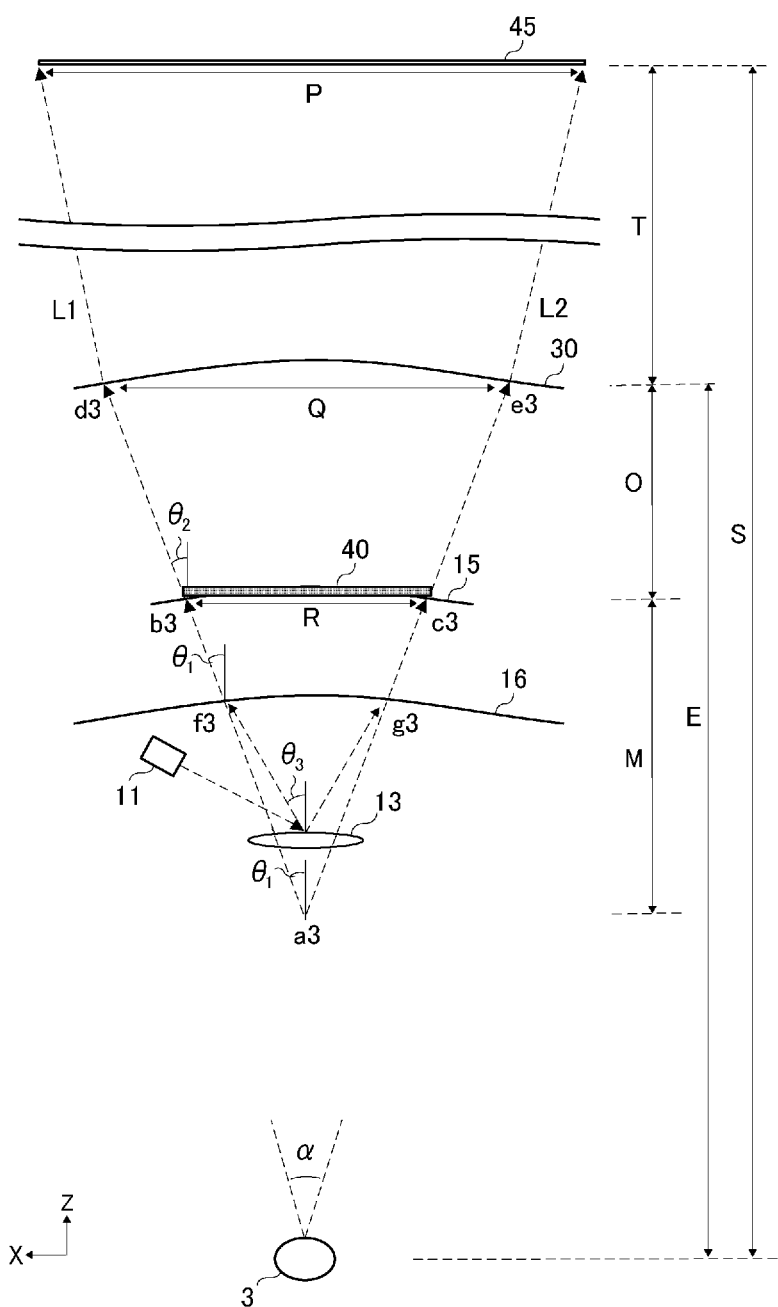
FIG. 15 is a schematic diagram illustrating the relative positions of the elements in a display system according to a third embodiment of the present disclosure.

FIG. 15 is a schematic diagram illustrating the relative positions of the elements in the display system 1C according to the third embodiment of the present disclosure. Each optical path length in FIG. 15 is equivalent to the corresponding optical path length defined in the first embodiment as described above.

The bundles of laser beams generated by the light-source device 11 are incident on the point a1 of the light deflector 13, and are deflected by the light deflector 13. After deflected, the bundles of laser beams are incident on the concave mirror 16, and two-dimensionally scans the screen 15 after the scanning angle is changed. The screen 15 forms the intermediate image 40 with a width R in the X-axis direction (main scanning direction).

The bundles of laser beams emitted from the light deflector 13 are incident on the concave mirror 16. In this configuration, the light beam that forms the edge (point b3) of the intermediate image 40 in the +X-direction is incident on a point d3 of the free-form surface mirror 30. On the other hand, the light beam that forms the edge (point c3) of the intermediate image 40 in the −X-direction is incident on a point e3 of the free-form surface mirror 30. The laser beam that is emitted from the screen 15, as illustrated in 15, indicates the central light beam of the diverging light.

The plane of the free-form surface mirror 30 is designed and shaped so as to reduce the optical strain that occurs on the front windshield 50. The light beams that are incident on the free-form surface mirror 30 are reflected according to the shape of the plane of the free-form surface mirror 30. The bundles of laser beams L1 and L2 that are reflected by the free-form surface mirror 30 are then incident on the front windshield 50, and reach at least one point of the location of the eyepoint within an eyelips area including the center of the eyelips (reference eyepoint).

The bundle of laser beams that are emitted from the light deflector 13 in the +X-direction at an angle of $\theta 3$ is incident on the concave mirror 16 at a point f3. The bundle of laser beams incident on the concave mirror 16 at the point f3 are reflected and the scanning angle is changed to $\theta 1$, and then are incident on the screen 15 at a point b3. On the other hand, the bundle of laser beams that are emitted from the light deflector 13 in the −X-direction at an angle of $\theta 3$ is incident on the concave mirror 16 at a point g3. The bundle of laser beams incident on the concave mirror 16 at the point g3 are reflected and the scanning angle is changed to $\theta 1$, and then are incident on the screen 15 at a point c3. In this configuration, the extension of a line connecting the point f3 to the point b3 projected on the XZ plane intersects with the extension of a line connecting the point g3 to the point c3 projected on the XZ plane at a point a3. For this reason, in a similar manner to the first embodiment and the second embodiment of the present disclosure, the optical path length M in the display device according to the third embodiment of the present disclosure is the optical path length between the center of the intermediate image 40 and the point a3 at which the extension of a line connecting the point b3 to the point d3 projected on the XZ plane intersects with the extension of a line connecting the point c3 to the point e3 projected on the XZ plane.

In this configuration, in a similar manner to the first embodiment of the present disclosure as described above, the similarity relationship between the shape that is defined by points a3, b3, and c3 and the shape that is defined by points a3, d3, and e3 holds true when the condition in the first equation is satisfied. The bundles of laser beams that are to form an edge of the image that is visually recognized by the viewer 3 may be optically designed so as to satisfy the first equation. Due to this configuration, the bundles of laser beams can efficiently be dispersed towards the eyelips area. Due to this configuration, in the display system 1C, reduction in brightness at an edge of the image and reduction in brightness when the viewer 3 moves his/her location of the eyepoint can be prevented.

The XYZ axes as illustrated in FIG. 15 may be changed in view of the layout when implemented in a vehicle. In FIG. 15, only the XZ plane is referred to. However, no limitation is indicated thereby, and system design may be conducted using a similar relational expression also in the Y-axis direction. As illustrated in FIG. 15, an example configuration in which the concave mirror 16 is arranged between the light deflector 13 and the screen 15 has been described. However, no limitation is intended thereby. For example, the concave mirror 16 may have a free-form surface. Alternatively, the concave mirror 16 may be a light transmission member such as a lens, in place of being a reflector. In the display system 1C, the screen 15 may have a function to change the scanning angle.

Effects of Third Embodiment

As described above, the display system 1C according to the third embodiment of the present disclosure is provided with the concave mirror 16 in the optical path between the light deflector 13 and the screen 15. In the display system 1C, the optical path length that is a specification value of the system can be optimized in view of the brightness distribution when the condition in the first equation is satisfied. Due to this configuration, in the display system 1C, prevent reduction in brightness at the edge of the virtual image 45 that is visually recognized by a viewer 3 and reduction in brightness when the viewer 3 moves his/her location of the eyepoint, and enable the viewer 3 to visually recognize an image with a sufficient brightness distribution.

CONCLUSION

As described above, the display system according to an embodiment of the present disclosure is provided with the screen 15 that disperses the light (an example of an optical element), and uses the diverging light dispersed by the screen 15 to form the virtual image 45 to be visually recognized by the viewer 3. The screen 15 is arranged such that the condition in the first equation as given below is satisfied.

First Equation $$S \times O \times (M+O)/(T \times E \times M) \leq 1.95 \qquad \text{[Math.9]}$$

In the first equation as above, S denotes the distance between the location of the eyepoint of the viewer 3 of the virtual image 45 and the virtual image 45, and E denotes the distance between the location of the eyepoint of the viewer 3 of the virtual image 45 and the free-form surface mirror 30 (an example of an image forming optical system) that uses the diverging light to form the virtual image 45. M denotes the distance between intermediate image 40 and the light deflector 13 that two-dimensionally scans the screen 15 to form the intermediate image 40 on the screen 15. O denotes the distance between the intermediate image 40 and the free-form surface mirror 30, and T denotes the distance between the virtual image 45 and the free-form surface mirror 30. Note also that the distance indicates the length of the optical path that passes through the center of the image formed by the above light when an object is observed from a reference eyepoint.

Due to this configuration, the display device 10 can prevent reduction in brightness at the edge of the virtual image 45 that is visually recognized by a viewer 3 and reduction in brightness when the viewer 3 moves his/her location of the eyepoint, and enable the viewer 3 to visually recognize an image with a sufficient brightness distribution.

Moreover, the display device 10 according to an embodiment of the present disclosure is provided with the light deflector 13 that scans the light beams that are emitted from the light-source device 11 (an example of a light source) in the main scanning direction and the sub-scanning direction orthogonal to the main scanning direction to form the intermediate image 40 on the screen 15 (i.e., an example of optical element). Further, the difference in angle between the incident angle at which the light beam is incident on the edges of the intermediate image 40 in the main scanning direction or the sub-scanning direction and the center point of the divergence angle of the diverging light that reaches the location of the eyepoint of the viewer 3 as the light incident on these edges is dispersed by the screen 15 is equal to or narrower than 10°. Due to this configuration, the display device 10 can prevent reduction in brightness at the edge of the virtual image 45 that is visually recognized by a viewer 3 and reduction in brightness when the viewer 3 moves his/her location of the eyepoint, and enable the viewer 3 to visually recognize an image with a sufficient brightness distribution.

Moreover, in the display device 10 according to an embodiment of the present disclosure, the similarity relationship holds true between a shape formed by connecting the light deflector 13 and both edges of the intermediate image 40 in the main scanning direction or the sub-scanning direction and a shape formed by connecting the light deflector 13 and both ends of the light beams incident on the free-form surface mirror 30 (an example of an image forming optical system) diverging from both edges of the intermediate image 40 in the main scanning direction or the sub-scanning direction. Due to this configuration, the display device 10 can prevent reduction in brightness at the edge of the virtual image 45 that is visually recognized by a viewer 3 and reduction in brightness when the viewer 3 moves his/her location of the eyepoint, and enable the viewer 3 to visually recognize an image with a sufficient brightness distribution.

In the display device 10 according to an embodiment of the present disclosure, the optical path length between the intermediate image 40 and the light deflector 13 that two-dimensionally scans the screen 15 (an example of an optical element) to form the intermediate image 40 on the screen 15 is 80 to 120 millimeters (mm). Due to this configuration, the display device 10 can be prevented from enlarging, and optimal optical design of the display device 10 is enabled.

Moreover, in the display device 10 according to an embodiment of the present disclosure, is provided with the liquid crystal panel 14 (an example of an optical element) that disperses the light. Due to this configuration, the display device 10 when the condition in the first equation is satisfied in the panel system can prevent reduction in brightness at the edge of the virtual image 45 that is visually recognized by a viewer 3, and enable the viewer 3 to visually recognize an image with a sufficient brightness distribution.

The display system according to an embodiment of the present disclosure is provided with the front windshield 50 (an example of a reflector) that reflects the diverging light diverging from the screen 15 (an example of an optical element), and the free-form surface mirror 30 (an example of an imaging optical system) that projects the diverging light diverging from the screen 15 towards the front windshield 50 to form the virtual image 45. Due to this configuration, the optical path length that is a specification value of the system can be optimized in view of the brightness distribution. Accordingly, the display systems 1A and 1B can prevent reduction in brightness at the edge of the virtual image 45 that is visually recognized by a viewer 3 and reduction in brightness when the viewer 3 moves his/her location of the eyepoint, and enable the viewer 3 to visually recognize an image with a sufficient brightness distribution.

The present disclosure can be implemented in any convenient form, for example using dedicated hardware, or a mixture of dedicated hardware and software. The present disclosure may be implemented as computer software implemented by one or more networked processing apparatuses. The processing apparatuses can compromise any suitably programmed apparatuses such as a general purpose computer, personal digital assistant, mobile telephone (such as a WAP or 3G-compliant phone) and so on. Since the present disclosure can be implemented as software, each and every aspect of the present disclosure thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

This patent application is based on and claims priority pursuant to 35 U.S.C. § 119(a) to Japanese Patent Application No. 2018-042728, filed on Mar. 9, 2018, in the Japan Patent Office, the entire disclosure of which is hereby incorporated by reference herein.

REFERENCE SINGS LIST 1A, 1B Display system
10 Display device
11 Light-source device
13 Light deflector
14 Liquid crystal panel
15 Screen (an example of optical element)
16 Concave mirror
30 Free-form surface mirror (an example of image forming optical system)
50 Front windshield 50 (an example of reflector)

The invention claimed is:

1. A display device, comprising:
an optical element (15) configured to disperse a light; and
a light deflector (13) configured to scan the optical element two-dimensionally to form an intermediate image on the optical element,
wherein a diverging light dispersed by the optical element is used to form a virtual image to be visually recognized by a viewer,
wherein the optical element is arranged to satisfy a condition in an equation $$S \times O \times (M+O)/(T \times E \times M) \leq 1.95$$

where S denotes distance between a location of eyepoint of the viewer of the virtual image and the virtual image, E denotes distance between the location of eyepoint of the viewer of the virtual image and an image forming optical system that uses the diverging light to form the virtual image, M denotes distance between the light deflector and the intermediate image, O denotes distance between the intermediate image and the image forming optical system, and T denotes distance between the virtual image and the image forming optical system,
wherein each distance indicates length of an optical path that passes through a center of an image formed by the light when an object is observed from a reference eyepoint, and
wherein an optical path length between the light deflector and the intermediate image is between 80 to 120 mm.

2. The display device according to claim 1,
wherein the light deflector scans a light emitted from a light source in a main scanning direction and a sub-scanning direction orthogonal to the main scanning direction to form the intermediate image on the optical element, and
wherein a difference in angle is equal to or narrower than 10° between an incident angle of a light incident on an edge of the intermediate image in the main scanning direction or the sub-scanning direction and a center point of a divergence angle of the diverging light that reaches the location of eyepoint of the viewer as the light incident on the edge is dispersed by the optical element.

3. The display device according to claim 2,
wherein a shape formed by connecting the light deflector and both edges of the intermediate image in the main scanning direction or the sub-scanning direction is similar to a shape formed by connecting the light deflector and both ends of the light diverging from both edges of the intermediate image in the main scanning direction or the sub-scanning direction and incident on the image forming optical system.

4. The display device according to claim 1, wherein the optical element is a microlens array in which a plurality of microlenses are arranged in an array.

5. A display system, comprising:
the display device according to claim 1;
a reflector configured to reflect diverging light diverging from the optical element; and
an imaging optical system configured to project the diverging light diverging from the optical element towards the reflector to form the virtual image.

6. A mobile object mounted with the display system according to claim 5,
wherein the reflector is a front windshield configured to reflect the diverging light.

* * * * *